United States Patent [19]

Sims

[11] 4,053,291
[45] Oct. 11, 1977

[54] CYLINDRICAL DEAERATOR

[75] Inventor: David L. Sims, West Palm Beach, Fla.

[73] Assignee: The United States of America as represented by the Secretary of the Air Force, Washington, D.C.

[21] Appl. No.: 715,594

[22] Filed: Aug. 18, 1976

[51] Int. Cl.² .......................................... B01D 19/00
[52] U.S. Cl. ...................................... 55/204; 55/182; 210/512 R
[58] Field of Search .................. 55/52, 182, 204, 205; 210/512

[56] References Cited
U.S. PATENT DOCUMENTS 3,129,173    4/1964    Schulze ........................... 210/512 R

FOREIGN PATENT DOCUMENTS 1,006,571    10/1965    United Kingdom ................. 55/204

Primary Examiner—Frank A. Spear, Jr.
Assistant Examiner—Richard W. Burks
Attorney, Agent, or Firm—Joseph E. Rusz; Arsen Tashjian

[57] ABSTRACT

An improved oil deaerator having an entrance tube with holes to allow much of the air to escape prior to entering the deaerator entry tube which is inclined and flattened causing the air/oil mixture to flow against the inside of the cylinder with the oil going to the outside and out the bottom louvers and the air escaping through a spout at the top. The unique design of the bottom with slotted or louvered oil exit openings and double cylinder arrangement reduces the possibility of the formation of a vortex.

1 Claim, 3 Drawing Figures

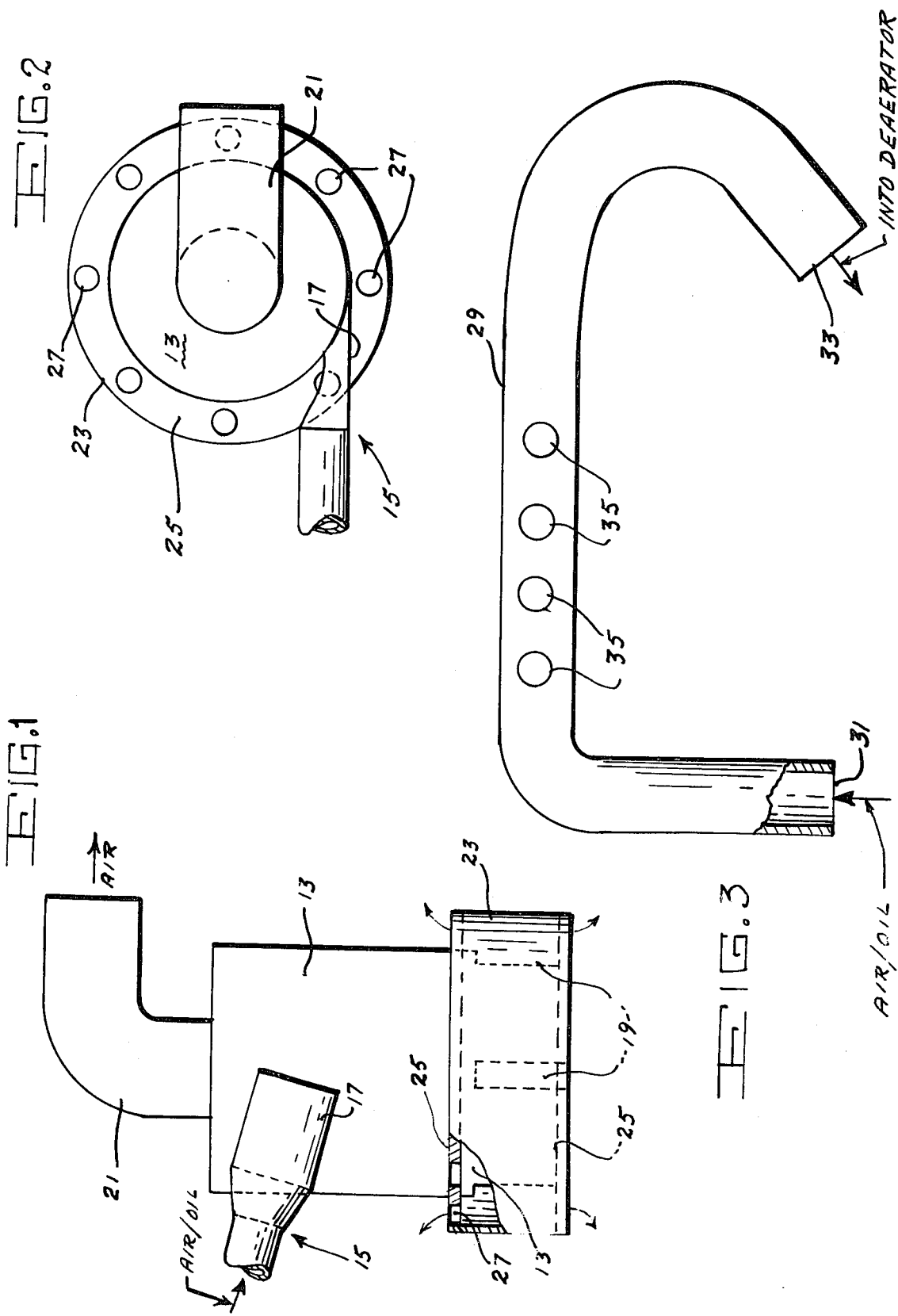

CYLINDRICAL DEAERATOR

STATEMENT OF GOVERNMENT INTEREST

The invention described herein may be manufactured and used by or for the Government for governmental purposes without the payment of any royalty thereon.

BACKGROUND OF THE INVENTION

This invention is a cylindrical deaerator for removing the air from an air/oil mixture and, more particularly, the invention is concerned with providing a cylindrical deaerator wherein the air/oil mixture is caused to enter the cylinder at a downward angle through a flattened entry tube and the deaerated oil exits through a louvered bottom which prevents the formation of vortices.

The cylindrical deaerator depends primarily on the centrifugal force of swirling air/oil mixture to free the air bubbles from the oil. In this type of deaerator the flow is generally directed toward the tank outlet inducing the formation of vortices with the resultant possibility of interruption of the steady flow of deaerated oil which is necessary for the proper functioning of an aircraft engine, for example. Also, the entry flow into presently known cylindrical deaerators is usually from a pipe of circular cross-section which is supplied by an entrance tube which does not have any holes in the wall thereof. The oil exits from the bottom of the cylinder through ordinary openings usually causing the formation of vortices.

In the hereinafter disclosed cylindrical deaerator, the above-mentioned drawbacks are eliminated by providing an inclined and flattened entry flow and a louvered or slotted oil exit. Also, a special bottom reduces the possibility of vortex while an entrance tube with holes allows much of the air to escape prior to entering the deaerator.

SUMMARY OF THE INVENTION

The present invention is concerned with providing a cylindrical deaerator for removing trapped air from lubricating oil in the circulating oil system of an engine. The air/oil mixture is first passed through an entrance tube with holes that discharge mostly air and then the mixture passes through an inclined and flattened entry tube into the cylinder where it is further deaerated. The deaerated oil exits from louvered or slotted openings in the bottom of the cylinder which is provided with a special bottom to reduce the possibility of vortex.

Accordingly, it is an object of the invention to provide a cylindrical deaerator having an inclined and flattened entry flow causing the oil to go to the outside and the air to escape through a spout at the top.

Another object of the invention is to provide a cylindrical deaerator having vertically oriented louvered or slotted exits in the wall near the bottom of the cylinder through which the deaerated oil flows.

Still another object of the invention is to provide a cylindrical deaerator wherein the bottom is designed to reduce the possibility of a vortex forming. The louvered cylinder is closed at the bottom and surrounded by a second, spaced apart, concentric cylinder of greater diameter with rims having holes between the two cylinders through which the deaerated oil is discharged.

A further object of the invention is to provide a specially designed entrance tube having holes in the wall thereof for attachment to the entry tube of a cylindrical deaerator. Much of the air in the air/oil mixture will escape prior to entering the entry tube of the deaerator and the turbulence of the mixure will be reduced.

These and other objects features and advantages will become more apparent after considering the following detailed description taken in conjunction with the annexed drawings and appended claims.

BRIEF DESCRIPTION OF THE DRAWINGS

FIG. 1 is an idealized front view partially broken away of a cylindrical deaerator according to the invention showing the flattened entry tube attached thereto and the special bottom with the louvered oil exits;

FIG. 2 is a top view of the cylindrical deaerator shown in FIG. 1 showing the position of the rim between the inner and outer cylinder with the discharge holes therein; and FIG. 3 is a partially broken away side view of the air/oil entrance tube for supplying the entry tube of the cylindrical deaerator showing the holes in the wall of the entrance tube to partially deaerate the air/oil mixture prior to entering the deaerator.

DESCRIPTION OF A PREFERRED EMBODIMENT

Referring now to the drawings, in FIG. 1 the cylindrical deaerator according to the invention includes a main cylinder 13 into which the air/oil mixture is received. Attached to the sidewall of the cylinder 13 is the deaerator entry tube 15 which is inclined downward to cause the air/oil mixture to flow downward against the inner sidewall of the cylinder 13. The entry tube 15 inludes a flattened portion 17 which serves to provide a flattened entry flow for more efficient deaeration of the air/oil mixture.

The bottom portion of the main cylinder 13 is provided with a plurality of vertically oriented louvers or slots 19 in the lower wall portion thereof through which the deaerated oil passes. The air which tends to move inward as the air/oil mixture flows around the inside wall of the main cylinder 13, escapes upward through the spout 21 at the top of the cylinder 13. The main cylinder 13 is closed at the bottom surface. A second concentric cylinder 23 is positioned in spaced relation around the lower portion of the main cylinder 13. Two annular rim members 25 are positioned between the main cylinder 13 and the concentric outer cylinder 23. A plurality of oil discharge holes 27 are disposed in the rim members 25 through which the deaerated oil from the slots 19 is discharged into the tank.

An entrance tube 29 having an inlet 31 and an outlet 33 can be used with the above-described deaerator to produce a more efficient device. The outlet 33 of the entrance tube 29 is attached to the round intake of the entry tube 15. A series of holes 35 are provided in the wall of the entrance tube 29 to allow much of the air in the air/oil mixture to escape prior to entering the deaerator. The entrance tube 29 also operates to reduce the violence of the air/oil stream and, therefore, allows a much higher flow rate into the cylinder deaerator.

In a preferred embodiment of the invention, the air/oil mixture enters the improved oil deaerator through a one-inch diameter entry tube 15 and is flattened out by a round-to-rectangular section 17. The mixture then flows against the inside wall of the cylinder 13 with the oil going to the outside and out the louvers or slots 19 at the bottom of the cylinder 13 and the air escaping through the spout 21 at the top. The mixture enters at an angle of 15 degrees forcing the oil continuously toward the bottpom of the deaerator cylinder at attitudes of up to 90°. The specially designed bottom reduces the possibility of a vortex forming.

The improved deaerator may be completely submerged in oil except for the air spout 21. As a matter of fact, the efficiency of the deaerating process increases as the oil level rises due to the back pressure forcing the air out faster. A typical deaerator is only three inches in diameter and handles a flow rate of 170 pounds per minute oil and 75 pounds per hour air. When used with the entrance tube 29 having the holes 35 in the wall thereof, the flow can be much higher. A typical entrance tube 29 would have eight ⅜ inch diameter holes that discharge mostly air. This reduces the violence and partially deaerates the mixture entering the deaerator.

Although the invention has been illustrated in the accompanying drawing and described in the foregoing specification in terms of a preferred embodiment thereof, the invention is not limited to this embodiment or to the particular configuration shown and described. It will be apparent to those skilled in the art that certain changes, modifications and substitutions can be made, particularly with respect to the positioning of the various openings without departing from the true spirit and scope of the appended claims.

Having thus set forth the nature of my invention, what I claim and desire to secure by Letters Patent of the United States is:

1. In combination, an improved cylindrical deaerator for separating the air from a circulating air/oil mixture and a curved elongated entrance tube having an inlet and an outlet, said deaerator comprising a main cylinder for receiving the air/oil mixture, a downwardly inclined entry tube attached through the sidewall in the upper portion of said main cylinder, said entry tube having a round inlet and a flattened outlet to supply the air/oil mixture tangential to the wall of said main cylinder, the outlet of said entrance tube being operatively connected to the inlet of the entry tube on said main cylinder, and a series of holes in the wall of said entrance tube to allow a substantial amount of the air in the air/oil mixture passing therethrough to escape prior to entering the deaerator, a series of vertically oriented elongated openings in the lowermost portion of the wall of said main cylinder, a spaced concentric outer cylinder positioned around the lower portion of said main cylinder, upper and lower rims disposed between the upper and lower edges of said outer cylinder and the wall of said main cylinder, a series of outlet holes in said rims to allow the deaerated oil to return to the tank, and a spout in the top center of said main cylinder to allow the separated air to escape.

* * * * *